(12) United States Patent
Hidaka

(10) Patent No.: US 7,330,312 B2
(45) Date of Patent: Feb. 12, 2008

(54) IMAGE BLUR COMPENSATION DEVICE

(75) Inventor: Toru Hidaka, Akishima (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/300,630

(22) Filed: Dec. 13, 2005

(65) Prior Publication Data

US 2006/0109552 A1     May 25, 2006

Related U.S. Application Data

(63) Continuation of application No. PCT/JP2004/007466, filed on May 25, 2004.

(30) Foreign Application Priority Data

Jun. 16, 2003  (JP) .............................. 2003-170936

(51) Int. Cl.
*G02B 27/64* (2006.01)
(52) U.S. Cl. .................... 359/555; 359/223; 396/55
(58) Field of Classification Search .................... None
See application file for complete search history.

(56) References Cited

U.S. PATENT DOCUMENTS

| | | | |
|---|---|---|---|
| 5,696,999 A | | 12/1997 | Matsushima et al. |
| 7,013,183 B1 * | | 3/2006 | Solomon ..................... 700/11 |
| 7,031,071 B2 * | | 4/2006 | Nishioka .................... 359/676 |
| 2002/0041445 A1 | | 4/2002 | Nishioka et al. |
| 2002/0102102 A1 | | 8/2002 | Watanabe et al. |
| 2004/0109236 A1 * | | 6/2004 | Nishioka .................... 359/643 |

FOREIGN PATENT DOCUMENTS

| JP | 6-250098 A | 9/1994 |
|---|---|---|
| JP | 9-80547 A | 3/1997 |
| JP | 9-213601 A | 8/1997 |
| JP | 2703581 B2 | 10/1997 |
| JP | 2918537 B2 | 4/1999 |
| JP | 2002-122784 A | 4/2002 |
| JP | 2002-214662 A | 7/2002 |
| JP | 2002-228816 A | 8/2002 |
| JP | 2002-287033 A | 10/2002 |
| JP | 2002-303783 A | 10/2002 |
| JP | 2003-111789 A | 4/2003 |

* cited by examiner

*Primary Examiner*—Arnel Lavarias
(74) *Attorney, Agent, or Firm*—Frishauf, Holtz, Goodman & Chick, P.C.

(57) ABSTRACT

An image blur compensation device for use with an image capture device including an imaging optical system and an imaging unit which converts a subject image captured on a light receiving surface thereof through the imaging optical system into an image signal. The compensation device includes a variable mirror which is provided on the optical axis of the imaging optical system and which has a displaceable reflective surface and an electrode to control the displacement of the reflective surface. A drive unit supplies the electrode with a drive signal to displace the reflective surface. And a compensation unit produces correction information to correct the drive signal.

3 Claims, 4 Drawing Sheets

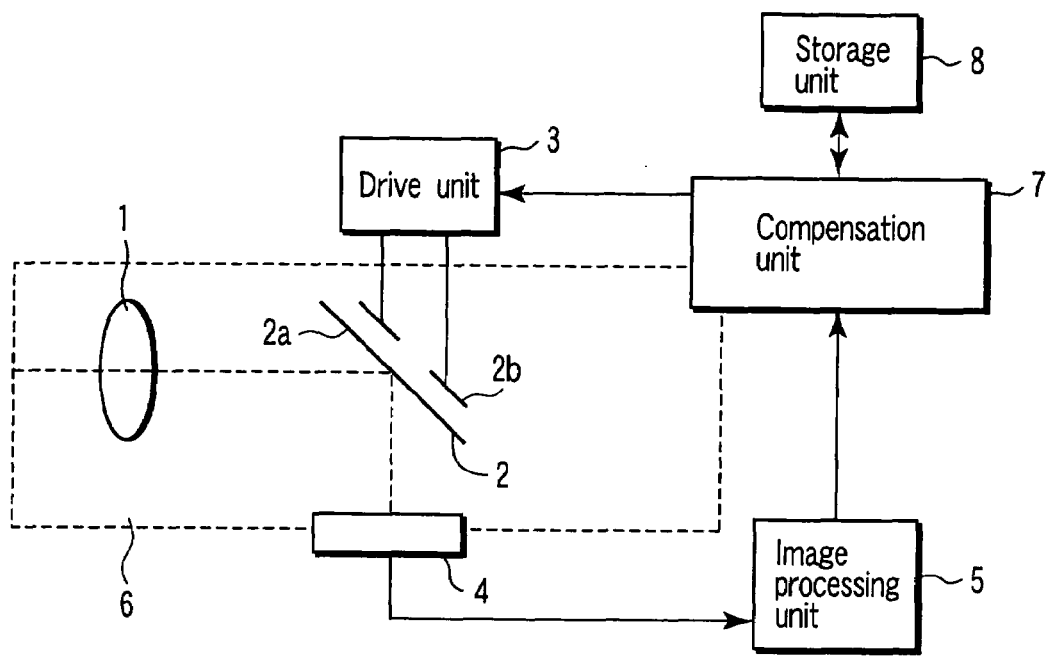
F I G. 1
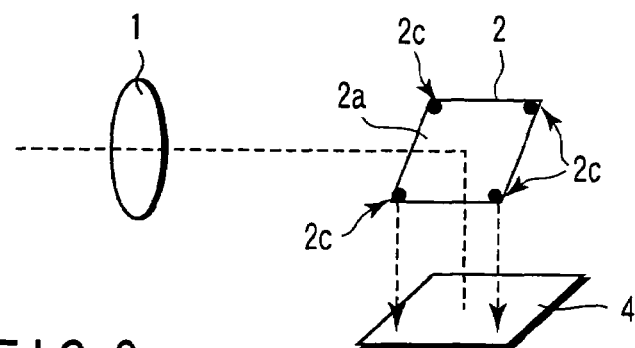
F I G. 2
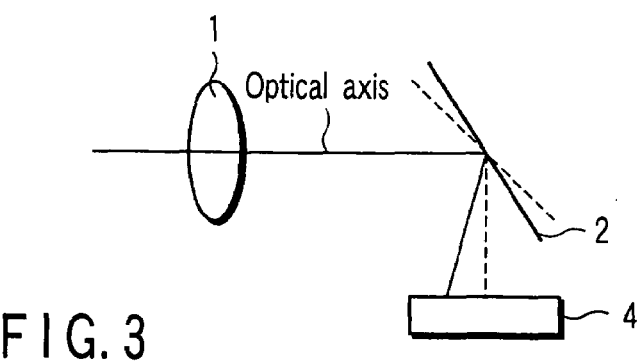
F I G. 3

IMAGE BLUR COMPENSATION DEVICE

CROSS-REFERENCE TO RELATED APPLICATIONS

This is a Continuation Application of PCT Application No. PCT/JP2004/007466, filed May 25, 2004, which was published under PCT Article 21(2) in Japanese.

This application is based upon and claims the benefit of priority from prior Japanese Patent Application No. 2003-170936, filed Jun. 16, 2003, the entire contents of which are incorporated herein by reference.

BACKGROUND OF THE INVENTION

1. Field of the Invention

The present invention relates to an image blur (camera shake) compensation device for use with image capture devices such as digital cameras.

2. Description of the Related Art

As one of the image blur compensation systems for use with image capture devices, a system has been hitherto known which makes image blur compensation by moving a moving lens in a vertical direction with respect to its optical axis (Japanese Patent Publications Nos. 2703581 and 2918537).

In addition, a method has been proposed which makes image blur compensation using a variable mirror built into an imaging optical system (Japanese Unexamined Patent Publication No. 2002-122784).

BRIEF SUMMARY OF THE INVENTION

An aspect of the present invention, there is provided an image blur compensation device for use with an image capture device including an imaging optical system and imaging means for converting a subject image captured on its light receiving surface through the imaging optical system into an image signal, comprising: a variable mirror provided on an optical axis of the imaging optical system and having a displaceable reflective surface and an electrode to control the displacement of the reflective surface; drive means for supplying the electrode with a drive signal to displace the reflective surface; and correction means for producing correction information to correct the drive signal.

BRIEF DESCRIPTION OF THE SEVERAL VIEWS OF THE DRAWING

FIG. 1 is a block diagram of an image blur compensation device according to an embodiment of the present invention;

FIG. 2 is a diagram for use in explanation of the principles of compensation by the image blur compensation device of the embodiment of the present invention;

FIG. 3 is a diagram illustrating the displacement of the variable mirror in the embodiment of the present invention;

DETAILED DESCRIPTION OF THE INVENTION

Figure 4:
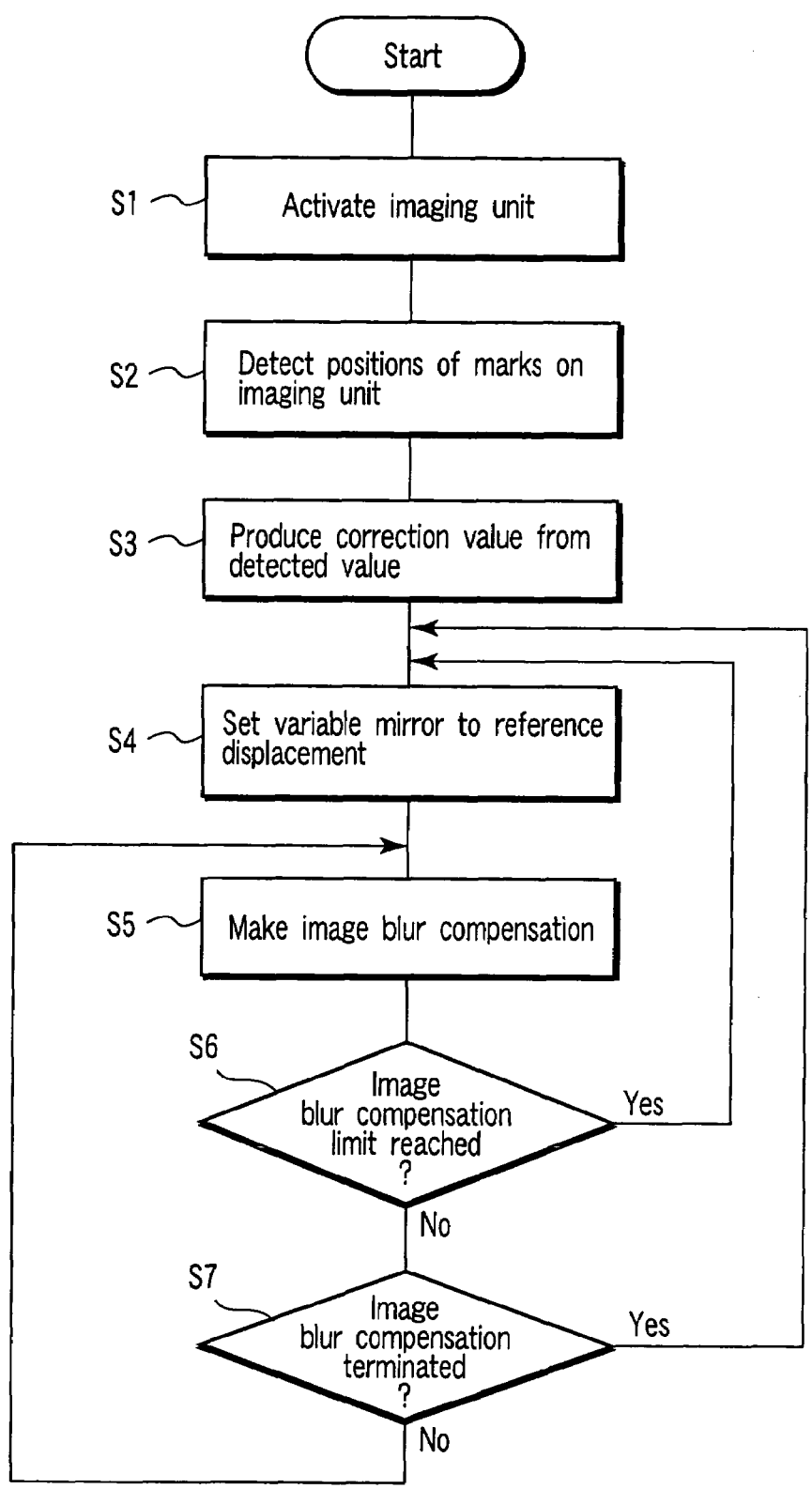
FIG. 4 is a flowchart illustrating a first operation of the image blur compensation device of the embodiment of the present invention.

An embodiment of the present invention will be described hereinafter with reference to the accompanying drawings.

FIG. 1 is a block diagram of that portion of a digital camera (image capture device) which is mainly associated with image blur compensation.

An imaging optical system 6 includes an imaging lens system 1 and a variable mirror 2. A subject image reflected by the reflective surface 2a of the variable mirror 2 is captured on an imaging unit 4. The variable mirror 2 has control electrodes 2b. By supplying drive signals from a driving unit 3 to the control electrodes 2b, the displacement of the reflective surface 2a (the tilt of the reflective surface relative to the optical axis) is controlled. The imaging unit 4, which is adapted to convert the subject image captured on its light receiving surface through the imaging lens system 1 and the variable mirror 2 into an image signal, comprises a CCD image sensor or the like.

The image signal output from the imaging unit 4 is input to an image processing unit 5 where predetermined image processing is performed on the basis of the image signal. The signal from the image processing unit 5 is supplied to a compensation unit 7, which produces correction information for correcting a displacement error of the reflective surface 2a. The correction information is applied to the driving unit 3, which outputs a corrected drive signal based on the correction information. The correction information is stored in a storage unit 8 as needed.

As shown in FIG. 2, the reflective surface 2a of the variable mirror 2 is formed with marks 2c at its four corners. The marks 2c are imaged onto the light receiving surface of the imaging unit 4. The positions on the imaging unit 4 where the marks 2c are imaged vary according to displacement of the reflective surface 2a. Thus, the detection of the imaged positions of the marks 2c allows the displacement of the reflective surface 2a of the variable mirror 2 to be detected. Specifically, by performing predetermined processing in the image processing unit 5 using the output signal of the imaging unit 4, the imaged positions of the marks 2c on the imaging unit 4 are detected and a position detect signal corresponding to the displacement state of the reflective surface 2a of the variable mirror 2 is output from the image processing unit 5.

On the variable mirror 2 the control electrodes 2b are placed in positions where they are opposed to the reflective surface 2a. By supplying drive voltages to the control electrodes 2b, the displacement of the reflective surface 2a which is a moving part varies by means of electrostatic force acting between the control electrodes 2b and the reflective surface 2a. Therefore, the displacement of the reflective surface 2a, i.e., the angle of the reflective surface 2a with respect to the optical axis of the imaging optical system 6 can be controlled according to the drive voltages supplied to the control electrodes 2b.

Thus, in the variable mirror, the displacement of the reflective surface is determined according to the drive signal; therefore, unlike image blur compensation using a moving lens, there is no need of means for detecting the position and the amount of movement of the moving lens.

Accordingly, control is easy in comparison with the case where the moving lens is used and moreover the size and weight can also be reduced.

With the variable mirror, however, the individual difference among variable mirrors and variable mirror mounting errors greatly affect the accuracy of image blur compensation. That is, both the displacement of the reflective surface when no drive signal is supplied to the variable mirror and the displacement of the reflective surface when a drive signal is supplied to the variable mirror depend upon the individual difference among variable mirrors and variable mirror mounting errors. For this reason, even when the same drive signal (drive voltage) is supplied to the control electrodes of a variable mirror, a displacement error will arise between the normal displacement of the reflective surface when the variable mirror is set in the normal state with no error and the displacement of the actually set reflective surface. Therefore, merely using the variable mirror involves difficulties in obtaining sufficient image blur compensation accuracy.

With this embodiment, information concerning the displaced state of the reflective surface 2a of the variable mirror 2 is produced on the basis of the imaged positions on the imaging unit 4 of the marks 2c formed on the variable mirror 2. And the compensation unit 7 produces correction information for correcting the displacement error of the reflective surface 2a from the information concerning the displaced state and then corrects a drive signal supplied from the drive unit 3 to the control electrodes 2b of the variable mirror 2 using the correction information.

Thus, with this embodiment, since the drive signal is corrected using the correction information produced by the compensation unit 7, it is possible to obtain sufficient image blur compensation accuracy even in the presence of the individual difference among variable mirrors and variable mirror mounting errors. In addition, information concerning the displaced state of the reflective surface 2a of the variable mirror 2 is produced on the basis of the imaged positions on the imaging unit 4 of the marks 2c formed on the variable mirror 2, thus allowing information concerning the displaced state to be obtained without using dedicated means and the device structure to be simplified.

A first operation of this embodiment will be described next with reference to a flowchart shown in FIG. 4.

First, the imaging unit 4 is activated by means of a power-on operation by way of example (S1). At this stage, the variable mirror 2 is maintained in the state prior to execution of an image blur compensating operation with the control electrodes 2b of the variable mirror 2 supplied with no drive signal. The marks 2c formed on the variable mirror 2 are imaged on the imaging unit 4 together with a subject image. The imaged positions of the marks 2c are detected by the image processing unit 5 on the basis of an output signal from the imaging unit 4 (S2).

The compensation unit 7 previously holds the normal imaged positions of the marks 2c when the variable mirror 2 is placed in the normal position relative to the optical axis. The compensation unit 7 produces correction information (correction value) for correcting the displacement error of the reflective surface from the normal imaged positions and the imaged positions of the marks 2c detected by the image processing unit 5 (S3). The correction information thus produced may be stored in the storage unit 8 as needed.

The correction information (correction signal) produced by the compensation unit 7 is supplied to the drive unit 3. The drive unit 3 supplies a drive signal corrected based on the correction information to the control electrodes 2 of the variable mirror 2. As a result, the displacement error of the reflective surface is canceled, causing the reflective surface of the variable mirror 2 to be set to the displaced state equivalent to the normal displaced state (S4). The displacement of the reflective surface 2a of the variable mirror 2 at this point shall be referred to as the reference displacement. The image blur compensation is carried out with such reference displacement as the reference state (S5).

When a limitation of the compensation is reached (for example, the displacement of the variable mirror 2 reaches a limitation) in carrying out image blur compensation (S6), a return is made to step S4 in which the displacement of the reflective surface 2a of the variable mirror 2 is set to the reference displaced state. Even when the image blur compensating operation has completed (S7), a return is made to step S4 to set the displacement of the reflective surface 2a of the variable mirror 2 to the reference displaced state. By performing such processing, the next image blur compensation can be started with the reference displaced state. For this reason, efficient image blur compensating operations can be carried out all the time.

Thus, according to this operation, correction information for correcting the displacement error of the reflective surface 2a of the variable mirror 2 when no drive signal is supplied to the control electrodes 2b is produced before an image blur compensating operation is carried out. Then, a drive signal corrected on the basis of the correction information sets the variable mirror 2 to the reference displaced state in which the displacement error has been canceled. For this reason, the image blur compensation can be made with reference to such a reference displaced state, allowing efficient image blur compensation to be made.

Figure 5:
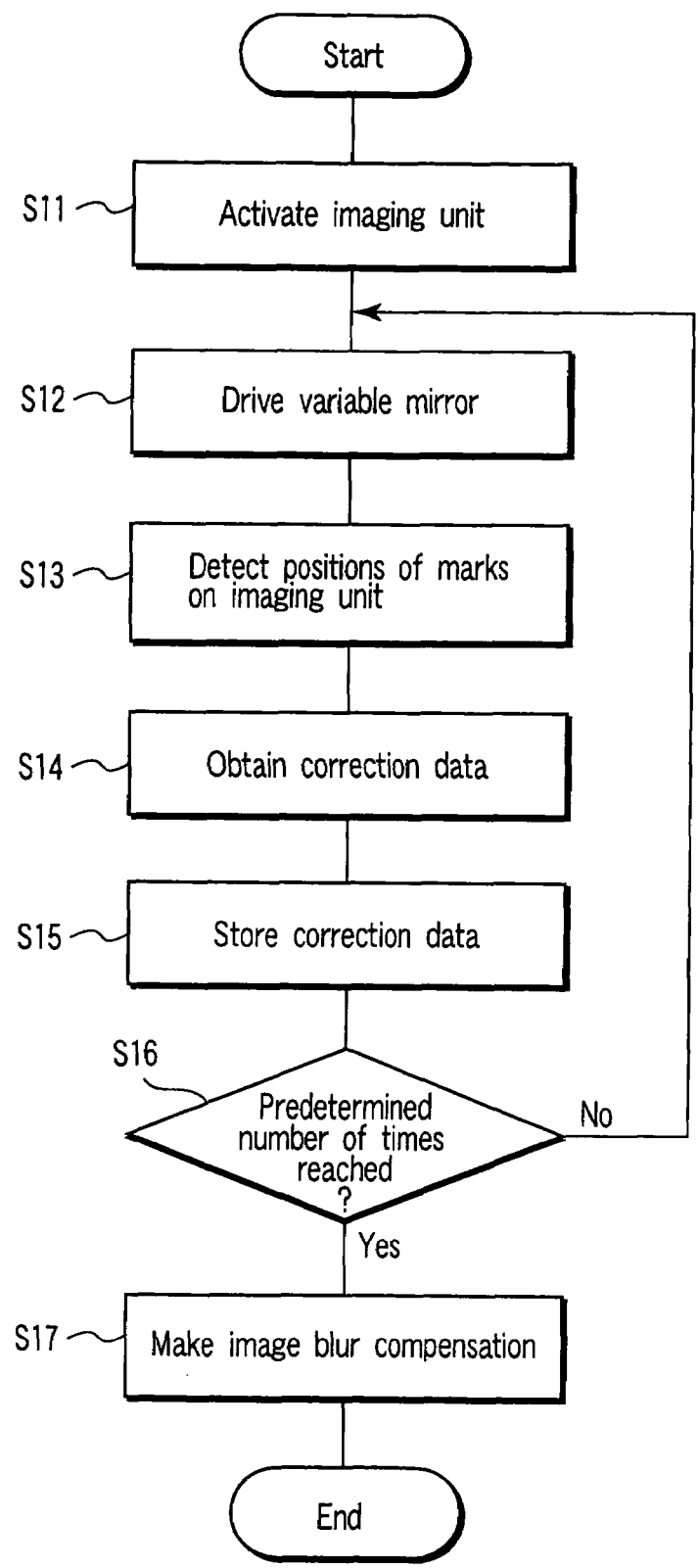
FIG. 5 is a flowchart illustrating a second operation of the image blur compensation device of the embodiment of the present invention.

A second operation of this embodiment will be described next with reference to a flowchart shown in FIG. 5.

First, the imaging unit 4 is activated by means of a power-on operation (S11). At this stage, the variable mirror 2 is maintained in the state prior to execution of an image blur compensating operation with the control electrodes 2b of the variable mirror 2 supplied with no drive signal. The marks 2c formed on the variable mirror 2 are imaged on the imaging unit 4 together with a subject image.

Then, a predetermined control signal for obtaining correction information is supplied from the compensation unit 7 to the drive unit 3. The drive unit 3 supplies a drive signal produced on the basis of the control signal to the variable mirror 2 to drive it (S12). As a result, the reflective surface 2a of the variable mirror 2 is displaced and the imaged positions on the imaging unit 4 of the marks 2c are changed accordingly. The imaged positions on the imaging unit 4 of the marks 2c are detected by the image processing unit 5 (S13).

The compensation unit 7 previously holds the normal imaged positions of the marks 2c when the variable mirror 2 is placed in the normal position relative to the optical axis. The compensation unit 7 produces correction information (correction data) for correcting the displacement error of the reflective surface from the normal imaged positions and the imaged positions of the marks 2c detected by the image processing unit 5 (S14). The correction information thus produced is stored in the storage unit 8 (S15).

The steps S12 through S15 are repeated a predetermined number of times while varying the value of the correction information obtaining control signal (S16). That is, the displacement of the reflective surface 2a of the variable mirror 2 is varied (the value of the drive signal is varied) so that correction information is produced for each displaced state. After the correction information has been obtained, image blur compensation is made using the correction information thus obtained (S17).

Thus, according to this operation, the reflective surface of the variable mirror is set to two or more displaced states by two or more drive signals different from one another prior to execution of an image blur compensating operation. In each of the displaced state, correction information for correcting the displacement error of the reflective surface of the variable mirror when a drive signal is applied to the control electrodes is produced. Therefore, proper and high-accuracy compensation can be made according to the displacement of the reflective surface of the variable mirror, allowing high-accuracy image blur compensation to be made at the execution of an image blur compensating operation.

Although, in the abovementioned embodiment, the marks 2c are formed at four corners of the reflective surface 2a, the four corners of the variable mirror may be used in place of the marks 2c. The marks 2c may be formed in other positions than the four corners. The number of the marks 2c is not limited to four. Moreover, as the imaged area of the marks 2c use may be made of pixel areas located around the effective pixel area of the imaging unit 4.

Next, a modification of this embodiment will be described with reference to FIGS. 6 and 7.

Figure 6:
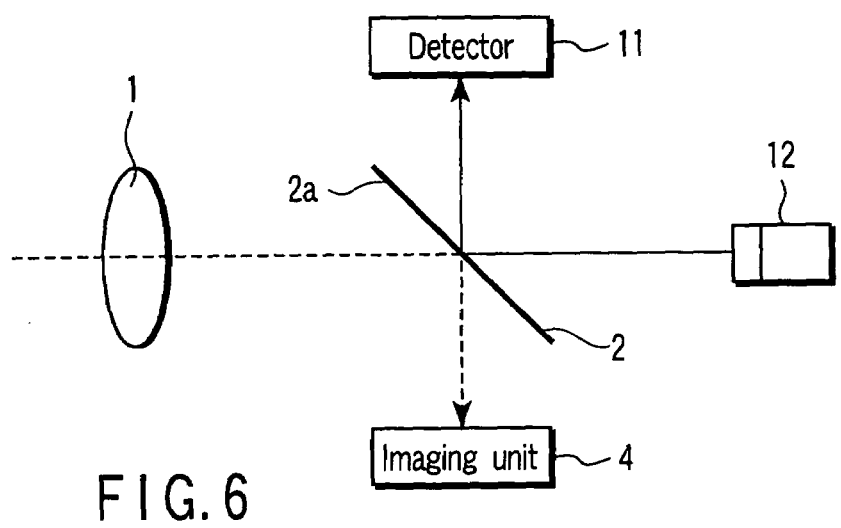
FIG. 6 shows a modification of the image blur compensation device of the embodiment of the present invention.
Figure 7:
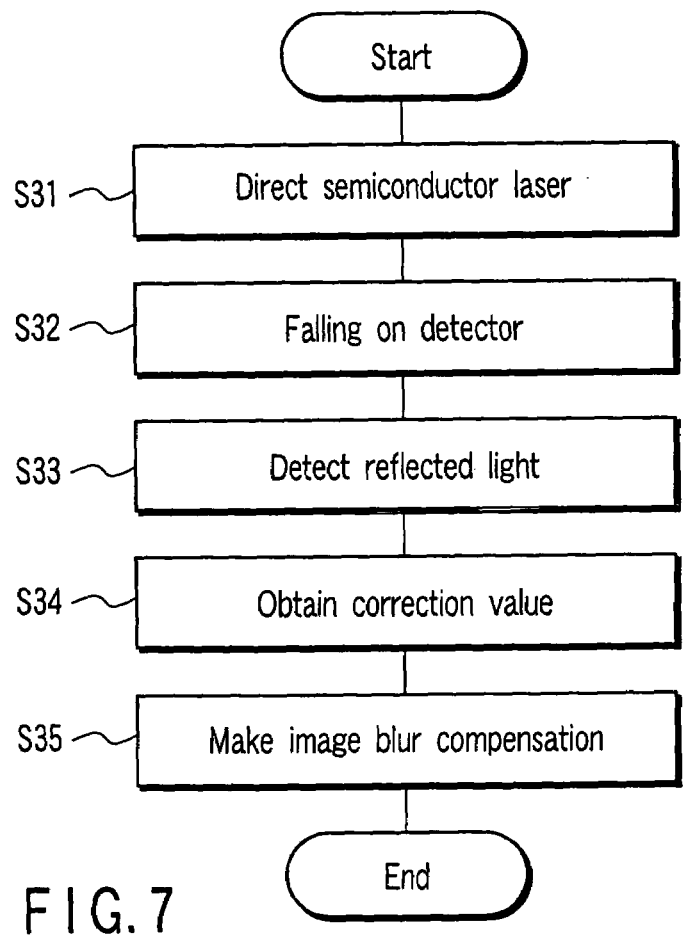
FIG. 7 is a flowchart illustrating an operation of the modification of the image blur compensation device of the embodiment of the present invention.

FIG. 6 is a diagram for use in explanation of the configuration of this modification. The basic device configuration is the same as that shown in FIG. 1 and hence FIG. 6 mainly shows only a portion different from the configuration of FIG. 1.

In this modification, as shown in FIG. 6, a point source 12 of light, such as a semiconductor laser, is provided on the back side of the reflective surface 2a of the variable mirror 2. Reflected light of a light beam directed from the point light source 12 onto the back of the reflective surface 2a is detected by the detector 11. The detected position on the detector 11 of the reflected light varies according to the displacement of the reflective surface 2a of the variable mirror 2. For this reason, correction information for correcting a drive signal can be produced by detecting the position of the reflected light.

The operation of this modification will be described next with reference to a flowchart shown in FIG. 7.

First, a light beam of a semiconductor laser is directed from the point light source 12 onto the back of the reflective surface 2a of the variable mirror 2 (S31). The light beam is reflected by the back of the reflective surface 2a and the reflected light then falls on the detector 11 (S32). The detector 11 detects the position of the reflected light on its detecting surface (S33). Information on the position of the reflected light detected by the detector 11 is supplied to the compensation unit 7 shown in FIG. 1. The compensation unit 7 then produces correction information for correcting a drive signal on the basis of the reflected light position information (S34). After that, image blur compensation is made in the same manner as the previously described method (S35).

Although, in this modification, a light beam is directed onto the back of the reflective surface 2a of the variable mirror 2, the light beam may be directed onto the reflective surface 2a of the variable mirror 2. The point light source 12 is not restricted to a semiconductor laser but may be a light emitting diode by way of example. Furthermore, a wave source, such as a sound wave, electromagnetic wave, may be used in place of the light source.

What is claimed is:

1. An image blur compensation device for use with an image capture device including an imaging optical system and imaging means for converting a subject image captured on a light receiving surface thereof through the imaging optical system into an image signal, comprising:
    a variable mirror which is provided on an optical axis of the imaging optical system and which comprises a displaceable reflective surface and at least one electrode to control displacement of the reflective surface;
    drive means for supplying the electrode with a drive signal to displace the reflective surface;
    correction means for producing correction information to correct the drive signal; and
    displaced state information producing means for producing information concerning a displaced state of the reflective surface and supplying the information to the correction means;
    wherein the displaced state information producing means produces the information concerning the displaced state based on a predetermined image different from the subject image captured on the imaging means; and
    wherein the predetermined image is an image of at least one mark formed on the reflective surface of the variable mirror.

2. An image blur compensation device for use with an image capture device including an imaging optical system and imaging means for converting a subject image captured on a light receiving surface thereof through the imaging optical system into an image signal, comprising:
    a variable mirror which is provided on an optical axis of the imaging optical system and which comprises a displaceable reflective surface and at least one electrode to control displacement of the reflective surface;
    drive means for supplying the electrode with a drive signal to displace the reflective surface; and
    correction means for producing correction information to correct the drive signal;
    wherein the correction means supplies the correction information to the drive means in order to correct a displacement error of the reflective surface when no drive signal is supplied to the electrode after an image blur compensating operation has been terminated.

3. An image blur compensation device for use with an image capture device including an imaging optical system and imaging means for converting a subject image captured on a light receiving surface thereof through the imaging optical system into an image signal, comprising:
    a variable mirror which is provided on an optical axis of the imaging optical system and which comprises a displaceable reflective surface and at least one electrode to control displacement of the reflective surface;
    drive means for supplying the electrode with a drive signal to displace the reflective surface; and
    correction means for producing correction information to correct the drive signal;
    wherein the correction means supplies the correction information to the drive means in order to correct a displacement error of the reflective surface when no drive signal is supplied to the electrode when the variable mirror has reached a control limit due to an image blur compensating operation.

* * * * *